Patented Mar. 12, 1929.

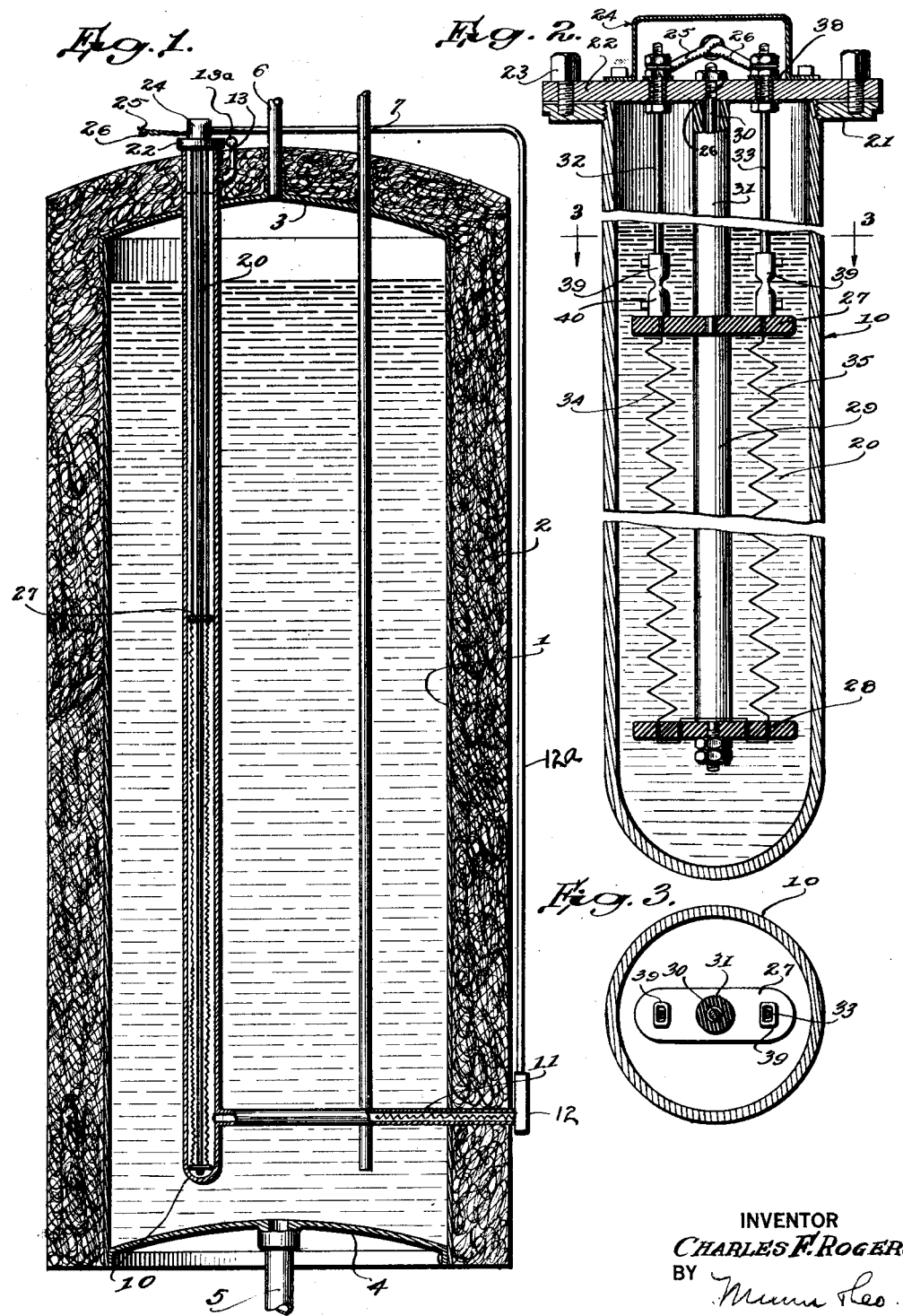

1,705,417

UNITED STATES PATENT OFFICE.

CHARLES F. ROGERS, OF JACKSONVILLE, FLORIDA, ASSIGNOR TO ELECTROMATIC MANUFACTURING COMPANY, INC., OF JACKSONVILLE, FLORIDA, A CORPORATION OF FLORIDA.

ELECTRIC WATER HEATER.

Application filed March 7, 1928. Serial No. 259,728.

This invention relates to automatic electric water heaters.

It is well known that concentration of heat by high temperature is destructive to heating elements, since it causes oxidation, gathers alkali and soon burns out the elements, thereby rendering the use of such heaters expensive and inefficient. Moreover, the temperature of the water, in the ordinary type of automatic heater, is controlled by the action of a thermostat operated by the temperature of the water. Hence, with no water in the tank, there is nothing to operate the thermostat and the heating element is burned out.

It is to overcome these objectionable features that this invention is designed, and a primary object thereof is to so construct a heater of this character that when, for any reason, there is no water in the tank, instead of burning out the heating element, the thermostatic control will be operated to open the circuit and prevent the heating element from being burned out.

Another object of the invention is to so construct such a heater that heat from the heating element will be distributed over a large area for the equal amount of heat units necessary to accomplish the desired results.

A still further object of the invention is to so construct such a heater that it may be operated at a low temperature to decrease the accumulation of alkali and increase the heating area of the heating element whereby the efficiency of the heater is greatly increased.

Another object is to provide a medium for the transmission of heat from the heating element which is a good conductor of heat and an insulator of electricity thereby increasing the heating area of the heating element and lowering the temperature of the heating element.

The principle of the heater comprising this invention employs a special oil incased in a tube of large heating area with a control tube extending into the heating tube and having a thermostat connecting through the water in the tank to the heating tube, the control tube being so located that when the set temperature of the water is reached, the thermostat will trip and open the circuit.

Still another object is to so construct a heater of this character that the heating element may work at a lower temperature with a large heating area and thereby eliminate the corrosive action of some waters as well as the elimination of alkali formation found in other types of heaters.

Still another object is to so construct such a heater that its life will be indefinite both as to efficiency as well as durability, and which may be operated continuously with no water in the tank without impairment to the heating element.

In carrying out these objects, the invention is susceptible of modification without departing from the spirit or sacrificing any of the advantages of the claimed invention; there being shown in the drawings for illustrative purposes a preferred and practical form, in which;

Figure 1 represents a vertical section of a heater constructed in accordance with this invention, shown in connection with a water containing tank, Fig. 2 is a similar view with parts broken out showing the heating tube and the heating element mounted therein, and Fig. 3 is a horizontal section taken on the line 3—3 of Fig. 2.

In the embodiment illustrated a water containing tank 1 is shown surrounded by an insulating jacket 2 of mineral wool or other suitable material. The tank, which may be of any desired configuration, is preferably cylindrical in form and is shown with a convexo-concave top head 3 and a similarly shaped bottom 4 from the latter of which leads a drain pipe 5. A water supply pipe is shown at 7 extending through the top 3 to a point near the bottom of the tank, and an outlet pipe 6, as is shown clearly in Fig. 1.

Extending from the top to about one inch of the bottom of the tank 1 and projecting above the top thereof is a tube 10, which may be of any desired cross sectional shape and of any desired size according to the size of the tank in connection with which it is to be used. This tube 10 is designed to contain oil which is not only a conductor of heat but an insulator of electricity, and which is adapted for use in the transmission of heat from the tube to the surrounding water in the tank. This tube 10 being of comparatively large area, thereby increases the heating area of the element contained in it and lowers the temperature of the heating element and thereby increases its efficiency owing to the decrease in the accumulation of alkali, which is incident to the low temperature.

Leading from the tube 10 at a point near the bottom of the tank is a smaller tube 11, which extends through the side wall of the tank and is designed to be connected with a thermostat, shown diagrammatically at 12 and which may be of any suitable construction, since the particular form constitutes no part of the invention. The return wire of the circuit being located in the conduit 12ᵃ. It will thus be seen that when the oil in the tube 10 reaches a predetermined temperature, it will operate through the communicating tube 11 and the thermostatic coil 11ᵃ therein to trip the thermostat and open the circuit, thus cutting off the current from the heating element and preventing its burning out.

Located within the tube 10 is an electric heating element 20 which extends throughout the length of the tube.

The outer face of the upper end of the tube 10 is threaded and has detachably mounted thereon an annular collar or flange 21 on which is designed to rest a cover plate 22 shown secured to the flange 21 by bolts 23. A standard fuse box 24 is fastened to the upper face of the plate 22 and forms an outlet for the wires 25 and 26 which supply the electricity for the heater 20.

The heating element 20 is suitably supported by lava cross arms 27 and 28 located respectively, one on top of a porcelain tube spacer 29, and the other on the bottom thereof, and through which passes a stud bolt 30 which extends through the plate 22 to a point near the bottom of the tube 10. Another porcelain spacing tube 31 is arranged above the cross arm 27 between it and the top plate 22 as is shown clearly in Fig. 2.

The heating unit which is carried by this plate 22 also includes terminals 32 and 33 connected with the resistance wires 34 and 35 above the cross arm 27.

The terminals 32 and 33 extend through the terminal base or plate 22 and have bushings 36 of formica arranged between them and the base plate and which has a high di-electric strength. These terminals 32 and 33 are spaced a suitable distance apart and mica washers 38 are used in locking up the terminals, which terminals are properly housed above the plate in a standard knockout box 24.

Suitable couplings 39 are used for connecting the terminals 32 and 33 with the wires 34 and 35 and are held in engagement therewith by set screws 40 to provide for their connection and separation when desired.

The entire heating unit is assembled with insulated adhesive porcelain cement producing a joint that is air-tight, fireproof, and having a high di-electric strength.

From the above, it will be obvious that by employing the extended area produced by the large oil heating tube 10, that the heating element 20 may be operated at a low working temperature and yet produce sufficient heat to heat the water in the tank to the desired temperature. This low temperature of the heating element in an oil medium eliminates the corrosive action of some waters, as well as the elimination of alkali found in other types of heaters wherein the heating element is subjected to the water of the tank.

This tube 10 is filled with oil before the heating element is inserted therein. Release pipe 13 has a ball check valve 13ᵃ on the top allowing for the release of any pressure that should form in this tube 10. However, this oil is put into tube 10 at about 500 degrees F. which is a much higher temperature than it would be under working conditions, and therefore creates a vacuum. This vacuum is held by said check valve.

It will thus be seen that the gist of this invention resides in the mounting of the heating unit within an oil containing tube of comparatively large area and employing a control tube 11 which is directly connected to the heating tube and acts on the thermostatic control so that when all water is drawn out of the tank, the heating of the oil beyond a predetermined limit will operate to actuate the thermostat and open the circuit, thereby preventing all possibility of the heating element burning out.

I claim:

1. A heating unit for hot water boilers and the like comprising an oil container having a heating element therein, a conduit leading from said container, and a thermostat connected to be operated by the oil in said conduit for opening a circuit and cutting off the heat from said element when the oil reaches a predetermined temperature.

2. The combination with a water tank having an oil containing tube extending thereinto, a heating unit mounted in said tube, and a thermostatic connection between the oil in said tube and said heating unit whereby when the oil reaches a predetermined temperature the thermostat will be operated and the heat cut off from the unit.

3. The combination with a water tank having an oil containing tube extending thereinto, a conduit leading from said tube through said tank, a thermostat connected with said conduit, a heating unit mounted in said tube, and a connection between said thermostat and unit whereby when the oil in the tube reaches a predetermined temperature, the thermostat will be operated and the heat from the unit cut off.

4. The combination with a water tank having an oil containing tube extending thereinto, a branch leading from said tube through said tank and connected to operate a thermostat, an electric heating unit mounted in said tube, and means whereby the operation of the thermostat will cut off heat from the heating unit.

Signed at Jacksonville, in the county of Duval and State of Florida, this 15 day of February A. D. 1928.

CHARLES F. ROGERS.